United States Patent
Maekawa (10) Patent No.: US 7,812,557 B2
(45) Date of Patent: Oct. 12, 2010

(54) MOTOR CONTROLLER, WASHING MACHINE, AND MOTOR CONTROL METHOD

(75) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 386 days.

(21) Appl. No.: 12/053,795

(22) Filed: Mar. 24, 2008

(65) Prior Publication Data

US 2008/0297099 A1 Dec. 4, 2008

(30) Foreign Application Priority Data

May 29, 2007 (JP) .............................. 2007-142054

(51) Int. Cl.
 *H02P 21/14* (2006.01)
(52) U.S. Cl. ............................ 318/400.32; 318/400.02; 318/610; 318/722; 388/906
(58) Field of Classification Search ............ 318/400.02, 318/400.15, 400.26, 400.27, 400.32, 609, 318/610, 700, 712, 716, 720–724; 388/906
See application file for complete search history.

(56) References Cited

U.S. PATENT DOCUMENTS

| 5,569,995 | A  | * | 10/1996 | Kusaka et al. ............... 318/717 |
| 7,489,099 | B2 | * | 2/2009  | Fujiwara et al. ............. 318/609 |
| 7,504,784 | B2 | * | 3/2009  | Asada et al. .................. 318/51  |
| 7,667,426 | B2 | * | 2/2010  | Jeong et al. ................. 318/700 |
| 2007/0043528 | A1 |   | 2/2007 | Bae |

FOREIGN PATENT DOCUMENTS

JP    2005-160183 A    6/2005

OTHER PUBLICATIONS

Chinese Office action for 200810109339 dated Apr. 14, 2010.

* cited by examiner

*Primary Examiner*—Bentsu Ro
(74) *Attorney, Agent, or Firm*—Pearne & Gordon LLP (57) ABSTRACT

A motor controller includes an output voltage modulator that outputs sinusoidally-modulated voltage for driving a motor; a modulation factor specifier allowing specification of a modulation factor greater than 1.0 for the output voltage; a current detector that detects current flowing in the motor; and a field-oriented controller that divides the current detected by the current detector into a d-axis current component and a q-axis current component and that conforms each of the components to a command current produced based on a command rotational speed; a rotational position estimator that estimates motor rotational speed and rotor rotational position for use by the field-oriented controller; wherein the position estimator includes a filter that smoothes a d-axis induced voltage obtained during the estimation, and the motor rotational speed and the rotor rotational position are estimated based on the d-axis induced voltage smoothed by the filter.

19 Claims, 6 Drawing Sheets

$EMA2n = (\alpha + \beta \times dYn/dt) \times Xn + (1 - (\alpha + \beta \times dYn/dt)) \times EMA2n-1$

MODULATION FACTOR 1.0

FIG. 3A

MODULATION FACTOR 1.2

MOTOR CONTROLLER, WASHING MACHINE, AND MOTOR CONTROL METHOD

CROSS-REFERENCE TO RELATED APPLICATIONS

This application is based upon and claims the benefit of priority from the prior Japanese Patent Application 2007-142054, filed on, May 29, 2007 the entire contents of which are incorporated herein by reference.

FIELD

The present disclosure relates to a motor controller that executes field-oriented motor control and over-modulation motor control under modulation factor greater than 1.0 when outputting sinusoidally-modulated voltage. The present disclosure also relates to a washing machine provided with such motor controller and a method of motor control.

BACKGROUND

Field-oriented motor control has become a common technology in the industry for achieving reduced electricity consumption and vibration. A sensor-less field oriented control, a variation of field-oriented control is increasing its application in meeting such requirements. A sensor-less field-oriented control drives the motor by estimating the rotational speed and position of the rotor (based on feed back control) and not by detection of the position sensor such as hall IC.

Applications requiring high-speed motor rotation employ a control method called over-modulation control. The over-modulation control modulates the modulation factor of sinusoidal applied voltage to be greater than 1.0 to increase effective output voltage and to reduce output current, which in turn reduces copper-loss and consequently, electricity consumption. Such control method is disclosed, for example in JP 2005-160183 A.

A combined use of sensor-less field oriented control and over-modulation control gives rise to the following problem. In over-modulation control, since the output voltage takes a distorted sinusoidal waveform, a harmonic component occurs in the output voltage and further in the output current. On the other hand, in sensor-less field-oriented control, since the above mentioned output voltage and output current are considered for calculation of rotational position of the rotor, if the rotational position is estimated during execution of over-modulation control, the result of estimation is affected by the harmonic component.

Further, since motor speed control and current control are executed based on the above mentioned estimation result, the harmonic component is circulated in the control system, consequently destabilizing the control and in some cases, possibly stopping the rotation of the motor.

SUMMARY

The present disclosure provides a motor controller capable of stable motor drive control even when combining sensor-less field-oriented control with over-modulation control. The present disclosure also provides a washing machine provided with such motor controller and a method of motor control.

The motor controller of the present disclosure includes an output voltage modulator that outputs sinusoidally-modulated voltage for driving a motor; a modulation factor specifier allowing specification of a modulation factor greater than 1.0 for the output voltage; a current detector that detects current flowing in the motor; and a field-oriented controller that divides the current detected by the current detector into a d-axis current component and a q-axis current component and that conforms each of the components to a command current produced based on a command rotational speed; a rotational position estimator that estimates motor rotational speed and rotor rotational position for use by the field-oriented controller; wherein the position estimator includes a filter that smoothes a d-axis induced voltage obtained during the estimation, and the motor rotational speed and the rotor rotational position are estimated based on the d-axis induced voltage smoothed by the filter.

The rotational position estimator calculates the d-axis induced voltage by output voltage or output current and motor constant and estimates the rotational speed and the rotational position based on the d-axis induced voltage. Thus, harmonic component occurring in the output voltage or the output current affects the calculation result of the d-axis induced voltage and impairs the stability of rotational speed and rotational position estimation. By employing the above configuration, over-modulation control is executed by specification of the modulation factor by the modulation factor specifier, in which case rotational speed and rotational position can be estimated based on output voltage and output current containing harmonic component since the harmonic component is removed from the calculation result of the d-axis induced voltage by the filter to result a smoothed d-axis induced voltage.

Further, the washing machine of the present disclosure includes the above described motor controller, and thus the present disclosure may be applied in controlling the motor used in the washing machine.

BRIEF DESCRIPTION OF THE DRAWINGS

Other objects, features and advantages of the present disclosure will become clear upon reviewing the following description of the embodiments with reference to the accompanying drawings, in which.

DETAILED DESCRIPTION

Figure 4:
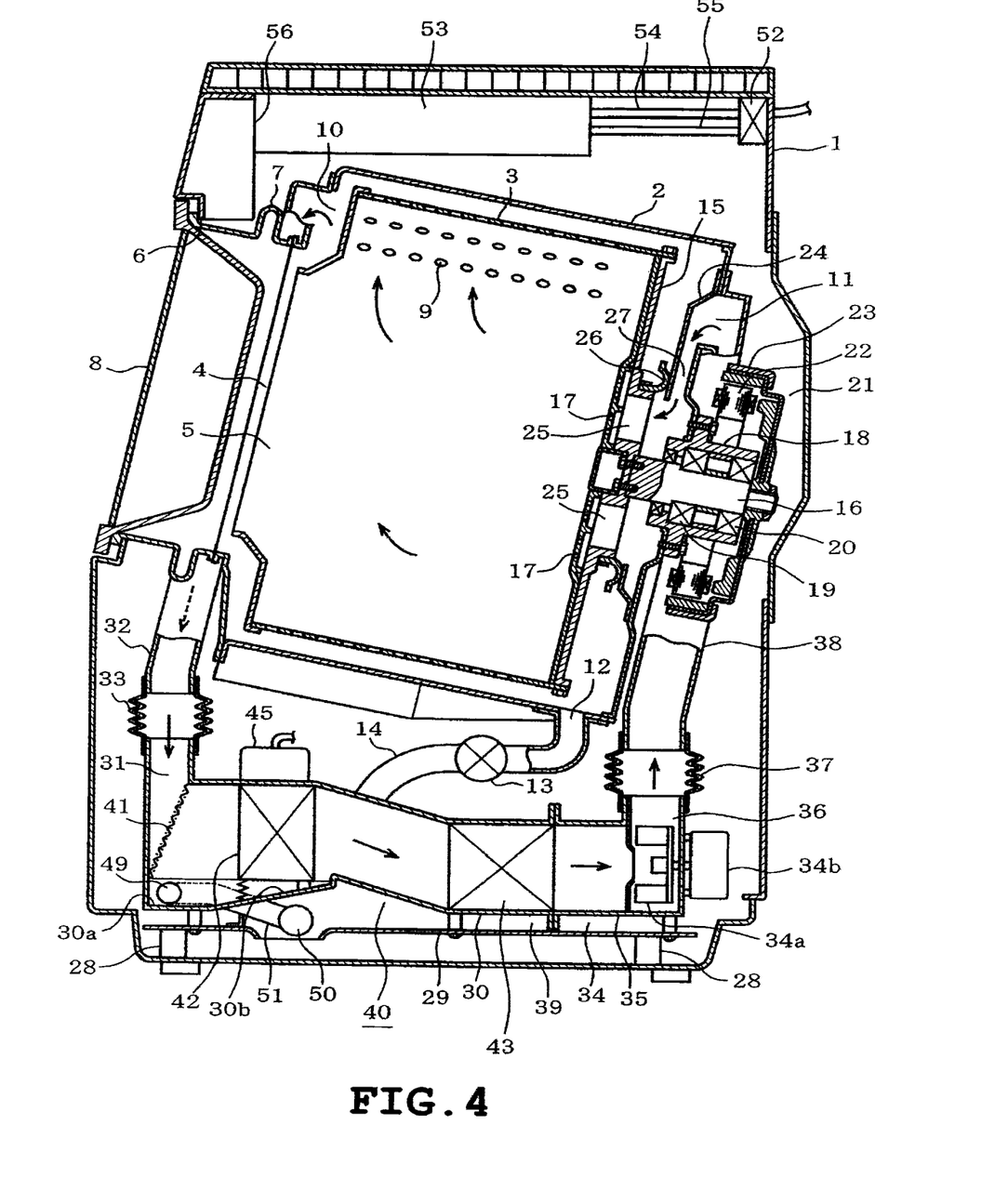
FIG. 4 is a side sectional view of a drum type washer dryer.

One exemplary embodiment will be described hereinafter with reference to the drawings. FIG. 4 is a vertical cross sectional view of a drum type (lateral axis) washer dryer containing a water tub 2 inside the cabinet 1. The water tub 2 contains a rotational tub (drum or dry compartment) 3. The cylindrical water tub 2 and the rotational tub 3 have openings 4 and 5 respectively in their front sides (left side in FIG. 4), and the opening 4 of the water tub 2 communicates with the opening 6 for loading and unloading of laundry defined in the front face of the cabinet 1 via bellows 7. An openable/closable door 8 is provided at the opening 6 the cabinet 1.

Perforations 9 are defined substantially throughout (though only a portion is shown) the periphery (waist) of the rotational tub 3. The perforations 9 function as water perforations during wash and dehydration and as air perforations during dry. A warm air outlet 10 is provided above the upper front-end side (portion above the opening 4) of the water tub 2 and a warm air inlet 11 is formed above the upper rear-end of the water tub 2. A drain outlet 12 is provided at the rearmost bottom of the water tub 2. The drain outlet 12 is connected to a drain valve 13 outside the water tub 2 which drain valve 13 is further connected to a drain hose 14 to provide outlet of water inside the water tub 2 to the machine exterior.

Further, a reinforcing element 15 is mounted on the back side of the rotational tub 3 rear surface and a rotary shaft 16 penetrates reward through the center of the reinforcing element 15. Plurality of warm air intake perforations 17 are formed in the periphery of the rear end of the rotational tub 3.

A bearing housing 18 is mounted on the rear surface center of the water tub 2. The rotary shaft 16 is passed through the bearing housing 18 via bearings 19 and 20. Thus, the water tub 2 and the rotational tub 3 are supported coaxially and rotatably. Elastic support is provided by the water tub 2 by a suspension not shown in the cabinet 1. The water tub 2 is laterally disposed with its axis running in the longitudinal direction (left and right direction in FIG. 4), the front portion of the axis being slightly inclined upward. Support is provided for the rotational tub 3 in the like manner.

A stator 22 of a motor 21 is mounted on the outer periphery of the bearing housing 18. A rotor 23 is mounted on the rear end of the rotary shaft 16 to oppose the stator 22 from the outside. The motor 21 is, thus, a brushless DC motor of an outer-rotor type and drives the rotational tub 3 about the rotational shaft 16 by direct drive method.

A warm air cover 24 is attached on the rear end interior of the water tub 2. A plurality of relatively large warm air intakes 25 are defined on the reinforcing element 15, more specifically, in the peripheral portions of the rotary shaft 16. A sealing element 26 is attached on the outer periphery of the portion where the warm air intakes 25 are defined so as to be placed in pressed contact with the front face of the warrm air cover 24. Thus an warm air passage 27 is established, providing airtight communication from a warm air inlet 11 to the warm air intake 25.

A platform 29 is placed below the water tub 2 (on the inner bottom surface of the cabinet 1) via a plurality of cushions 28. An air duct 30 is placed on the platform 29. The air duct 30 has an air suction 31 at its upper front end portion, and the warm air outlet 10 of the water tub 2 is connected to the air intake 31 via circulation duct 32 and a connection hose 33. The circulation duct 32 is configured to circumvent the left side of the bellows 7.

On the other hand, a casing 35 of a re-circulation blower 34 is connected to the rear end of the airflow duct 30. An exit 36 of the casing 35 communicates with the warm air inlet 11 of the water tub 2 via a connection hose 37 and an air supply duct 38. The air supply duct 38 is configured to circumvent the left side of the motor 21.

The airflow passage 39 communicating with the warm air outlet 10 and the warm air inlet 11 of the water tub 2 is configured by the circulation duct 32, the connection hose 33, an airflow duct 30, a casing 35, a connection hose 37 and an air supply duct 38. The re-circulation blower 34 blows out the air inside the rotational tub 3 through the airflow passage 39 and re-circulates the air back into the rotational tub 3. The airflow 39 and the re-circulation blower 34 constitute a re-circulation unit 40 that re-circulates air inside the rotational tub 3.

The re-circulation blower 34 is configured by a centrifugal fan, for example, and a centrifugal impeller 34a is provided in the casing 35. The centrifugal impeller 34a is rotated by a motor 34b provided outside the casing 35.

The airflow duct 30 placed in the airflow passage 39 contains a filter 41, an evaporator 42, and a condenser 43 in listed sequence as viewed in the front-rear orientation of the airflow duct 39. The filter 41 collects lint carried by the air inside the rotational tub 3 flowing into the airflow duct 30 from the warm air outlet 10 of the water tub 2 via the circulation duct 32 and the connection hose 33. The evaporator 42 is configured by a meandering path configured by a copper-made refrigerant circulation pipe having a plurality of heat transfer fins made of aluminum, for example attached to it. The condenser 43 is also configured in the same manner and the air inside the rotational tub 3 flown into the airflow duct 30 passes through the heat transfer fins.

Figure 5:
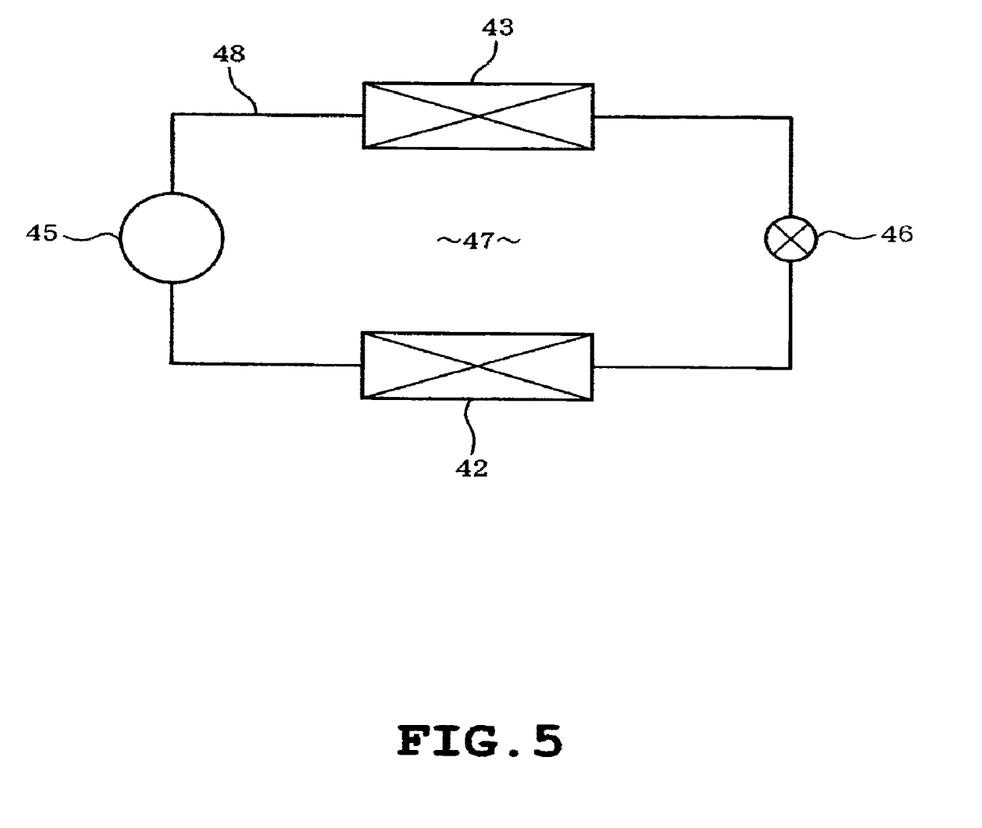
FIG. 5 shows the heat pump cycle of the washer dryer.

Referring to FIG. 5, the heat pump 47 is configured by a compressor 45, a condenser 43, a valve 46, and the evaporator 42 connected by a connection pipe 48 in listed sequence to define a cooling cycle for circulating the refrigerant sealed in the connected components by activating of the compressor 45. A refrigerant for high-temperature use such as R134a is used as a refrigerant. As shown in FIG. 4, the compressor 45 is placed outside and in close proximity of the airflow duct 30. The valve 46 in the present exemplary embodiment is configured by an expansion valve (such as electronic expansion valve like PMV (Pulse Motor Valve)) and allows adjustment in valve opening.

A moisture outlet 49 is defined on the side surface of the airflow duct 30 situated between the air intake 31 and the evaporator 42, more specifically in a portion that faces the bottom 30a. The moisture outlet 49 is connected to the drain 50 defined on the lower side surface of the cabinet 1 via a connection pipe 51. The bottom surface of the airflow duct 30 is downwardly sloped toward the moisture outlet 49 at portion 30b located immediately below the evaporator 42.

A water supply valve 52 is placed on an upper portion of the cabinet 1 interior and has a plurality of exits that is connected to the water supplier 53 situated in the upper front portion of the cabinet 1 interior via connection pipes 54 and 55. Though only briefly shown, the water supplier 53 has a detergent and a softener intake. By selectively opening/closing the exit, the water supply valve 52 supplies water from the connection pipe 54 into the water tub 2 via the detergent intake of the water supplier 53 during wash, and likewise, supplies water from the connection pipe 55 into the water tub 2 via the softener intake of the water supplier 53 during final rinse.

The controller 56 is disposed in the rear side of the upper front portion of the cabinet 1 and is configured by a microcomputer, for example, to control the overall operation of the washer dryer. The controller 56 receives various input of operation signals inputted from an operation input console composed of various operation switches provided in the operation panel (not shown), and the water level detection signal is inputted from the water level sensor provided for detecting the water level inside the water tub 2.

Further, the controller 56 receives input of temperature detection signals from the temperature sensors that detect the temperature of the entrance and exit of the evaporator 42, the condenser 43, and the refrigerant exhaust of the compressor 45. The controller 56 also receives input of current detection signals from the later described A/D converter. The controller 56 controls components such as the water supply valve 52, the motor 21, the drain valve 13, the compressor 45, the valve 46, the motor 34b for re-circulation blower 34, and a compressor blower for cooling the compressor 45 via drive circuits (not shown) based on the aforementioned various input signals and the pre-stored control programs.

Figure 1:
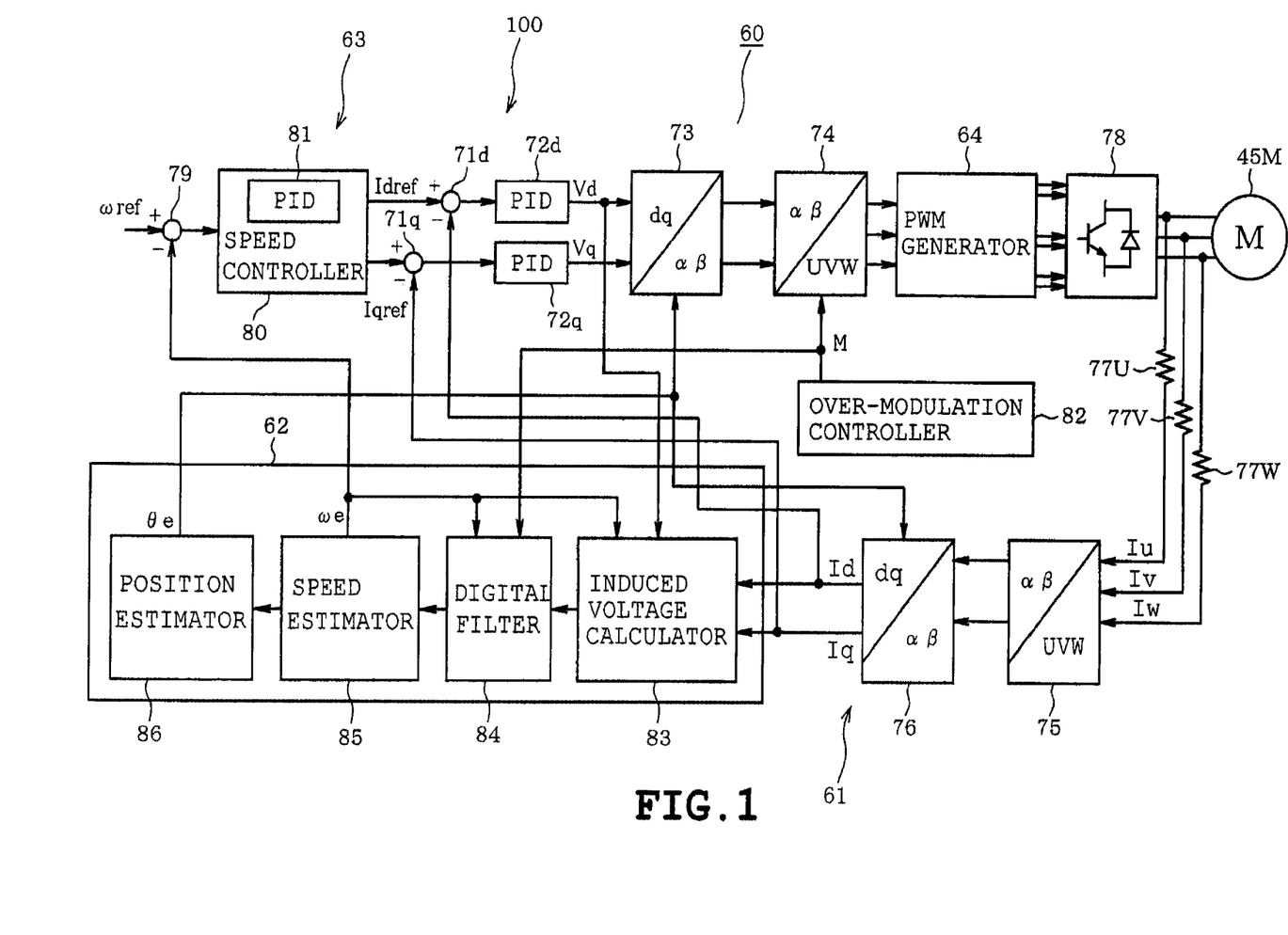
FIG. 1 is a block diagram of a motor controller according to a first exemplary embodiment of the present disclosure.

FIG. 1 is a block diagram describing the configuration of the motor controller 60 that executes field-oriented control of the motor rotation of motor 45M constituting the compressor 45. In a field-oriented control, current flowing in the armature winding is divided into the direction of magnetic flux of the permanent magnet and the direction orthogonal to it. The direction of magnetic flux can also be described as the direction of magnetic field. The two directions are controlled independently of the other to control the magnetic flux and generated torque. A current value described by a coordinate system, known as the d-q coordinate system that rotates with the rotor motor 45M is employed in current control. The d-axis indicates the direction of magnetic flux produced by the permanent magnet mounted on the rotor and the q-axis is orthogonal to the d-axis. A q-axis current Iq which is a q-axis component of the current flowing in the winding is a component (torque component current) generating rotational torque, whereas a d-axis current Id which is a d-axis component is a component (excitation or magnetization component current) for generating magnetic flux.

The motor controller 60 includes a current controller 61, a rotational position estimator 62, speed controller 63, and a PWM signal generator 64 (corresponding to output voltage modulator). The current controller 61 controls the values of the d-axis current Id and q-axis current Iq actually flowing in the motor 45M to conform with a command d-axis current Idref and command q-axis current Iqref outputted from the speed controller 63 respectively. The current controller 61 includes subtractors 71d and 71q, a PID (Proportional Integral Derivative) calculators 72d and 72q, a dq/αβ coordinate converter 73, an αβ/UVW coordinate converter (output voltage modulator) 74, a UVW/αβ coordinate converter 75, and an αβ/dq coordinate converter 76.

The current sensors 77 (U, V, W) are detection sensors for detecting currents Iu, Iv, and Iw flowing in each phase (U phase, V phase, W phase) of the motor 45M. The currents Iu, Iv, and Iw may be detected based on terminal voltages of three shunt resistance elements disposed between the switching element and the ground in the lower arm side that constitute the inverter circuit 78 (output voltage modulator) instead of the current sensors 77.

Currents Iu, Iv, and Iw detected by the current sensors (corresponding to current detectors) 77 undergo A/D conversion by the A/D converter, thereafter converted into two-phase currents Iα and Iβ by the UVW/αβ coordinate converter 75 and the two-phase currents Iα and Iβ are further converted into d-axis current Id, and q-axis current Iq by the αβ/dq coordinate converter 76. The symbols α and β indicate the coordinate axes of the 2-axis coordinate system fixed on the stator of the motor 45M. A later described rotational position estimate (estimate of phase difference between α-axis and d-axis) θe of the rotor is used in the calculation of coordinate conversion at the αβ/dq coordinate converter 76.

As for d-axis current Id and q-axis current Iq, errors ΔId and ΔIq from command d-axis current Idref and command q-axis current Iqref outputted from the speed controller 63 are calculated at the subtractors 71d and 71q. Proportional-Integral-Derivative calculation (hereinafter referred to as PID calculation) is performed on the current errors ΔId and ΔIq at the PID calculators 72d, and 72q to calculate command output voltages Vd and Vq described in d-q coordinate system. The command output voltages Vd and Vq are converted to values described in the α-β coordinate system by the dq/αβ coordinate converter 73 and is further converted into command phase voltages Vu, Vv, and Vw of the stator by αβ/UVW coordinate converter 74. The later described rotational position estimate θe of the rotor is used in the calculation of coordinate conversion at the dq/αβ coordinate converter 73.

PWM generator 64 receives inputs of phase voltages Vu, Vv, and Vw to generate pulse-modulated gate drive signals for supplying voltages conforming with command voltages. The inverter 78 is configured by three-phase bridge connection of switching elements such as IGBT (Insulated Gate Bipolar Transistor) and receives supply of direct current voltage from a direct current circuit not shown. The gate drive signals produced at the PWM generator 64 are sent to each of the switching elements of the inverter circuit 78, whereby a pulse-width modulated three-phase alternating voltages conforming with the command phase voltages Vu, Vv, and Vw are produced and applied on the armature winding of the motor 45M.

In the above described configuration, the feedback control is executed by the PID calculation performed by the subtractors 71d and 71q and the PID calculators 72d and 72q to control the d-axis current Id and q-axis current Iq to conform with the command d-axis current Idref and command q-axis current Iqref.

The rotational position estimator 62 receives the d-axis current Id, q-axis current Iq and the command output voltage Vd of the d-axis to obtain the estimate θe of the rotational position θ of the rotor and the estimate ωe of angular speed ω. Further, the rotational position estimator 62 stores circuit constants of the motor 45M such as d-axis inductance Ld, q-axis inductance Lq and winding resistance R of the armature winding.

The rotational position estimator 62 calculates the d-axis induced voltage estimate Ed by the following equation based on the above described input values and circuit constants.

$$Ed = Vd - R \cdot Id - Ld \cdot p \cdot Id + \omega e \cdot Lq \cdot Iq \quad (1)$$

In the above equation, p is a differential operator PID calculation is performed on the induced voltage estimate Ed and the result is outputted as the angular speed estimate ωe of the rotor. Since integration is performed on the angular speed estimate ωe, the calculation result is outputted as rotational position estimate θe. The angular speed estimate ωe is also inputted to the speed controller 63.

The speed controller 63 is a circuit that outputs command d-axis current Idref and command q-axis current Iqref. The command d-axis current Idref and command q-axis current Iqref are command currents for conforming the rotor angular speed ω (corresponding to rotational speed) with command angular speed ωref (command rotational speed) inputted from external source. The speed controller 63 is configured by a subtractor 79 and a dq distributor 80.

The subtractor 79 calculates error Δω of angular speed estimate ωe from command angular speed ωref outputted by the controller 56. PID calculation is further performed on error Δω by the PID calculator 81 included in the dq distributor 80 and the result of calculation is distributed to command d-axis current Idref and command q-axis current Iqref.

Then command d-axis current Idref and command q-axis current Iqref are passed to the current controller 61 so that d-axis current Id and q-axis current Iq of the motor 45M are controlled to conform with them as described earlier. As the result of the control, the angular speed estimate ωe is fed back to the subtractor 79. The error Δω is converged to zero by PID calculation performed by the PID calculator 81. As a result, the angular speed estimate ωe conforms with the command angular speed ωref.

The motor controller 60 is provided with a modulation factor specifier 82. The modulation factor specifier 82 determines the modulation factor M based on control commands, or the like, provided by the controller 56 and outputs the same to the αβ/UVW coordinate converter 74 and the rotational position estimator 62. Then, the αβ/UVW coordinate converter 74 determines the amplitude of the sinusoidal output-voltage based on the given modulation factor M to output the command voltages Vd and Vq. For instance, when specifying the rotational speed of the motor 45M at or greater than a predetermined speed, an over-modulation control is executed in which the modulation factor M is equal to or greater than 1.0 (thus, the modulation factor specifier 82 may determine the modulation factor M by referencing the command angular speed ωref).

Further, the rotational position estimator 62 is configured by an induced voltage specifier 83, a digital filter 84, a speed estimator 85, and a position estimator 86. The induced voltage calculator 83 calculates the d-axis induced voltage estimate Ed by the above equation (1), and a low pass filter for smoothing the estimate Ed is employed as the digital filter 84. The speed estimator 85 obtains angular speed estimate θe by performing PID calculation on the estimate Ed smoothed (low pass filtered) by the digital filter 84 and the position estimator 86 obtains rotational position estimate θe by integration of angular speed estimate ωe.

The current controller 61, the rotational position estimator 62, and the speed controller 63 described above constitute the field-oriented controller 100.

Next, the details of the digital filter 84 and the operation and effect of the present exemplary embodiment will be described with reference to FIGS. 2 and 3. When the modulation factor M determined by the modulation factor specifier 82 exceeds 1.0, the output voltage waveform exhibits an over-modulated state where distortion (harmonic component) occurs in the sinusoidal wave. For instance, FIGS. 3A and 3B indicate the phase voltage waveforms when the modulation factors M are 1.0 and 1.2 respectively, and it can be observed that at α=1.2, the waveform is distorted. Thus, harmonic component is superimposed on the current wave, and the d-axis induced voltage Ed estimated by the rotational position estimator 62 is also affected to contain harmonic wave component.

The present exemplary embodiment provides a digital filter 84 at the rotational position estimator 62 and the harmonic component contained in the estimate Ed calculated by equation (1) is removed and smoothed by the induced voltage calculator 83. The digital filter 84 is configured as an EMA (Exponential Moving Average) filter serving as a primary IIR (Infinite Impulse Response).

Assuming a discrete system of A/D conversion cycle, the EMA filter can be defined by equation (2) when Xn is taken as input data of the digital filter 84.

$$EMAn = \alpha \cdot Xn + (1-\alpha) \cdot EMAn-1 \qquad (2)$$

α: constant taking a value of 1 or smaller
EMAn: current filter output
EMAn−1: previous filter output The current filter output EMAn can be described as the sum of current input Xn multiplied by α and previous filter output EMAn−1 multiplied by (1−α). Thus, filter response is smoothed when constant α takes a smaller value to reduce the cutoff frequency. However, since the filter implemented by equation (2) is a linear system, a uniform response is given to the input. Such linear filter is effective when the input is steady; however, when variation in input occurs due to variation in frequency of the input signal component or when the input contains sizable noise, for example, a delay is created in the filter response rendering the filter ineffective.

To address such problem, the present exemplary embodiment incorporates non-linear calculation in equation (2) as follows.

$$EMA2n = \{\alpha + \beta \cdot (dYn/dt)\} \cdot Xn + [1 - \{\alpha + \beta \cdot (dYn/dt)\}] \cdot EMA2n-1 \qquad (3)$$

B: gain element
Yn: filter input discrete from Xn

In equation (3), α in equation (2) is replaced by $\{\alpha+\beta \cdot (dYn/dt)\}$. In this case, α is a variable and the $\{\alpha+\beta \cdot (dYn/dt)\}$ is limited so that its maximum value is 1. Filter input Yn constituting the additional filter input is a statistical value for determining the cutoff frequency of the filter, and may be equalized with Xn (Yn=Xn).

When employing the digital filter 84 implementing equation (3) as a control system for the configuration shown in FIG. 1, each parameter is interpreted as follows.

Xn: induced voltage estimate Ed
Yn: speed estimate ωe
α: a variable determined based on modulation factor M
β: conversion gain in conversion (unit conversion) from angular frequency to voltage Conversion gain β is determined based on allowable ranges for angular frequency and voltage. For example, β=1.5 when the range of voltage is 0 to 600V, and range of angular frequency is 0 to 400 Hz.

Figure 2:
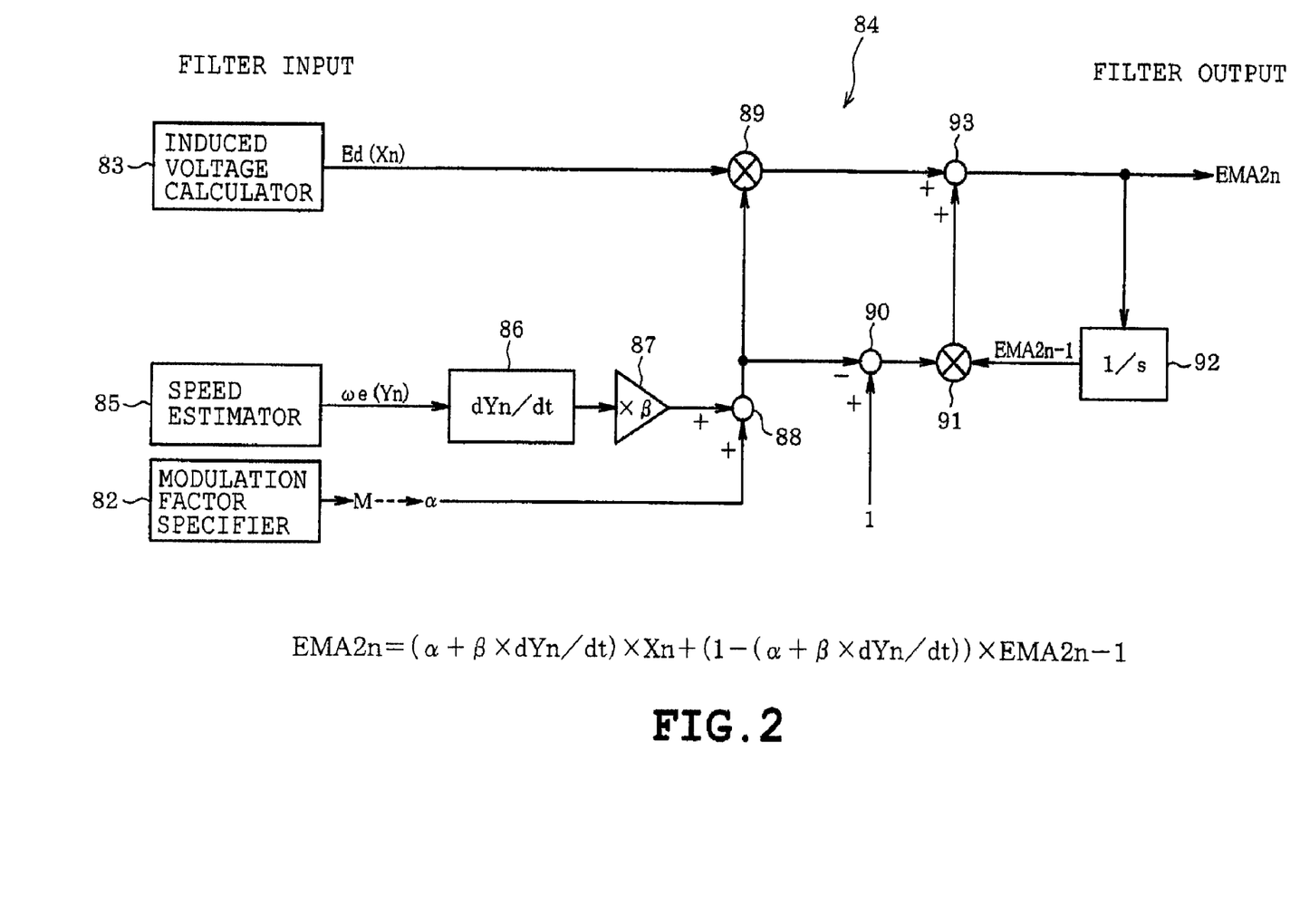
FIG. 2 shows a filter configuration.

FIG. 2 describes the above described configuration of the digital filter 84. That is, differentiation is performed on speed estimate ωe by the differentiator 86, the differentiation output is amplified by gain β at the amplifier 87, and thereafter added to variable α at the accumulator 88. Then, the sum produced at the accumulator 88 is multiplied by induced voltage estimate Ed at the multiplier 89; and at the subtractor 90, the aforementioned sum is subtracted from the constant "1". The result of subtraction at the subtractor 90 is outputted to the multiplier 91 and is multiplied by the previous filter output EMA2n−1 given via the delayer 92. The output of the multiplier 89 and 91 are added at the accumulator 93 to produce the current filter output EMA2n.

A qualitative description will be given hereinafter on the operation of the filter 84 configured as described above. When the modification factor M is small, since no distortion occurs in the voltage waveform, the amplitude as well as the frequency of the harmonic component contained in the voltage and current waveforms are low. Further, since the impact of the induced voltage given on the current is low, the impact of the distortion of the induced voltage is also low. In such case, in view of suppressing the delay in filter pass-band component, it is preferable to increase the setting of the cutoff frequency. Since the delay has critical impact on system responsiveness, control of the delay is of great significance.

On the other hand, when the modulation factor M is large, the amount of harmonic component contained in the voltage and current waveforms is increased, and the current suffers greater impact by the induced voltage. Thus, occurrence of distorted component in the current affects the current. In this case, the variable α is reduced based on the modification factor M to reduce the cutoff frequency.

Next, a description will be given on the derivative term. The derivative term indicates speed variation rate since Yn=ωe. The derivative term is substantially zero when speed is steadily controlled with very little changes, and filter response is determined by modulation factor M only. On the other hand, the derivative term is increased when there is large variation in speed as at acceleration and deceleration, thus, the constant $\{\alpha+\beta \cdot (dYn/dt)\}$ by which the filter input Xn is multiplied is increased. As a result, the cutoff frequency of the filter is increased and the smoothing function becomes less effective, consequently improving the system responsiveness.

In the present exemplary embodiment, the induced voltage estimate Ed is filter input, and the position estimate algorithm estimates the rotation count ωe based on estimate Ed, thus, responsiveness of estimate Ed directly affects the estimate responsiveness of rotation count ωe. That is, equation (3) is employed at acceleration/deceleration that requires rapid speed responsiveness since improvement in estimate responsiveness of induced voltage Ed is preferable in such cases. The input Yn only requires that it has a correlation with Xn which is the subject of smoothing and a different control system will have its own optimum parameters.

Figure 3A:
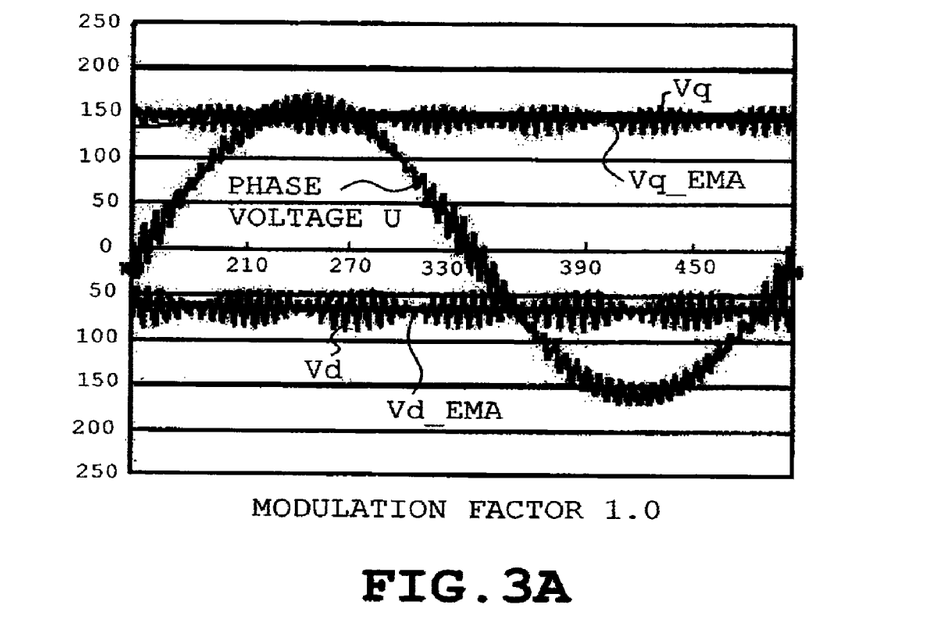
FIG. 3A is a chart indicating a phase-voltage waveform when modulation factor is 1.0.
Figure 3B:
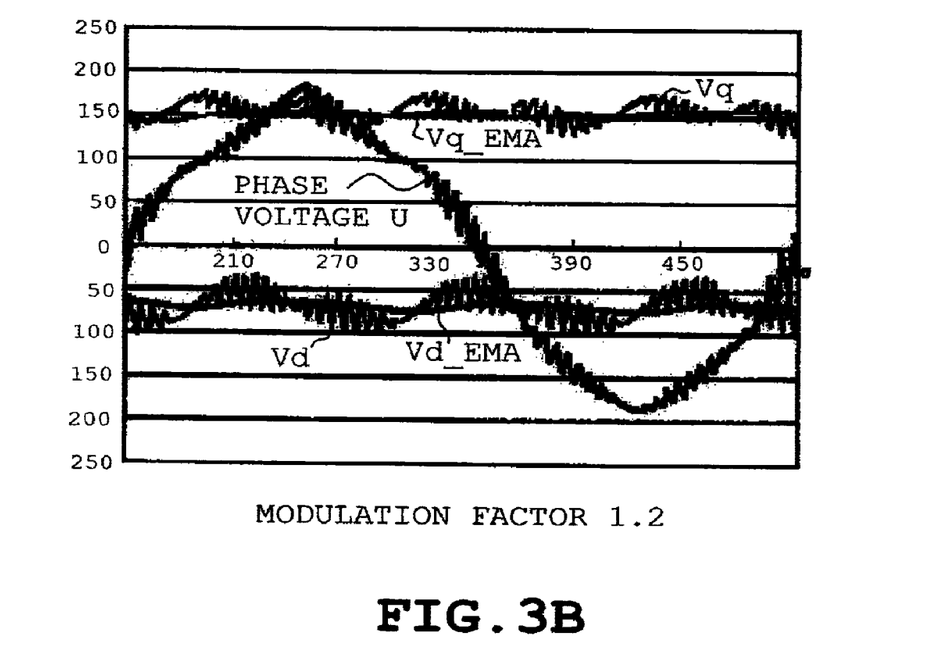
FIG. 3B is a chart indicating a phase-voltage waveform when modulation factor is 1.2.
Figure 3C:
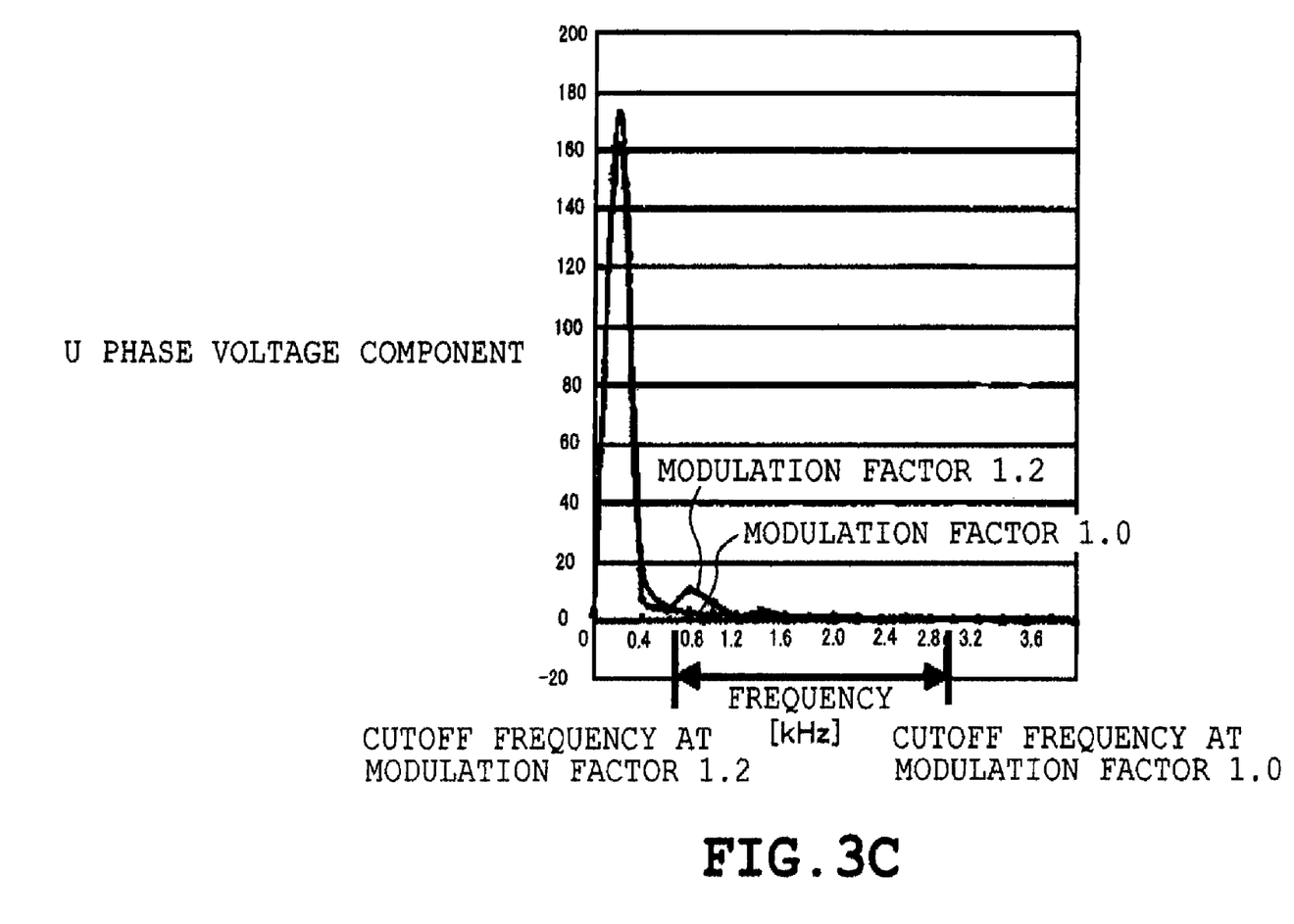
FIG. 3C is a chart indicating frequency spectrums of the waveforms indicated in FIGS. 3A and 3B.

FIG. 3C shows the frequency spectrum of the voltage waveform when modulation factor is 1.0 and 1.2, respectively. For example, when drive frequency for a four-pole motor is 100 rps (0.2 kHz) and the modulation factor is 1.2, harmonic component is quadrupled or quintupled to 0.8 kHz or 1.0 kHz. Thus, when the modulation factor is 1.0, the cutoff frequency of the filter 84 is set at 3 kHz, for example, and a switching waveform component originating from PWM control is removed. When the upper limit of the modulation factor is set at 1.2, the cutoff frequency is set at 0.7 kHz, for example. By changing the cutoff frequency depending on the modulation factor M and removing the harmonic component contained in the induced voltage estimate Ed as described above, the speed estimator 84 and position estimator 85 can achieve steady acquisition of estimates ωe and θe.

FIGS. 3A and 3B indicate waveforms of output voltage Vd when filter 84 is active (Vd_EMA) and when filter 84 is inactive. It can be observed from FIG. 3B that harmonic component is removed from waveform Vd_EMA.

As described above, the present embodiment executes sensor-less field-oriented control by detection of current flowing in the motor 45, and over-modulation control by specifying the modulation factor M greater than 1.0 by the modulation factor specifier 82 as follows. The rotational position estimator 62 smoothes the d-axis induced voltage Ed obtained during the process of position estimation, and rotational speed ωe and rotational position θe are estimated based on the smoothed d-axis induced voltage. Thus, steady execution of sensor-less field-oriented control is allowed even when over-modulation control is executed.

The filter 84 is implemented as an EMA filter incorporating a non-linear term that performs differential calculation of the speed estimate ωe configured to variably specify constant α for determining the cutoff frequency based on modulation factor M. Thus, d-axis induced voltage Ed can be smoothed under the principle of moving average and the cutoff frequency can be suitably varied based on modulation factor M. Further, the cutoff frequency of the filter 84 can be rapidly changed by non-linear term even when the rotational speed of the motor 45M is changed. Thus, dynamic optimization of filter 84 properties can be carried out based on the amount of harmonic component and requirement of speed responsiveness to obtain control stability while maintaining fair responsiveness.

Further, since the present exemplary embodiment employs the motor controller 60 for controlling the compressor motor 45M of the compressor 45 constituting the heat pump 47 of the washer dryer, when rapid temperature elevation is required at the rotational tub 3 when starting the dry operation for example, the output of the compressor 45 can be increased by increasing the rotation count of the motor 45M by over-modulation control in reduced electricity consumption and improved efficiency.

The present disclosure is not limited to the exemplary embodiments described above and illustrated in the accompanying drawings but may be modified or expanded as follows.

The EMA filter may employ equation (2) under a control system in which very little change occur in filter input.

Also, the cutoff frequency of the filter maybe fixed at the lowest limit allowing removal of harmonic component.

Further, filters other than EMA filters may be employed depending on design requirements.

PID calculators 72 and 81 may be replaced by a differential calculator depending on system requirements.

The present disclosure is not limited for use in a compressor motor for the washer dryer but may be used for a rotor 21 that exerts rotational drive force for executing wash, rinse and dehydration of the washer dryer. The present disclosure may be used in motors that are driven by combination of sensor-less field-oriented control and over-modulation control.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor controller, comprising:
   an output voltage modulator that outputs sinusoidally-modulated voltage for driving a motor;
   a modulation factor specifier allowing specification of a modulation factor greater than 1.0 for the output voltage;
   a current detector that detects a current flowing in the motor; and
   a field-oriented controller that divides the current detected by the current detector into a d-axis current component and a q-axis current component and that conforms each of the components to a command current produced based on a command rotational speed;
   a rotational position estimator that estimates motor rotational speed and rotor rotational position for use by the field-oriented controller;
   wherein the rotational position estimator includes a filter that smoothes a d-axis induced voltage obtained during the estimation, and the motor rotational speed and the rotor, rotational position are estimated based on the d-axis induced voltage smoothed by the filter.

2. The motor controller of claim 1, wherein the filter variably specifies a constant for determining a cutoff frequency based on the modulation factor specified by the modulation factor specifier.

3. The motor controller of claim 1, wherein the filter variably specifies a constant for determining a cutoff frequency based on a change rate of the rotational speed estimated by the rotational position estimator.

4. The motor controller of claim 1, wherein the filter is configured by an EMA (Exponential Moving Average) filter.

5. The motor controller of claim 4, wherein the EMA filter includes a non-linear term.

6. The motor controller of claim 5, wherein the non-linear term performs differential calculation on the rotational speed estimated by the rotational position estimator.

7. A washing machine, comprising:
   an output voltage modulator that outputs sinusoidally-modulated voltage for driving a motor;

a modulation factor specifier allowing specification of a modulation factor greater than 1.0 for the output voltage;

a current detector that detects a current flowing in the motor; and a field-oriented controller that divides the current detected by the current detector into a d-axis current component and a q-axis current component and that conforms each of the components with a command current produced based on a command rotational speed;

a rotational position estimator that estimates a motor rotational speed and a rotor rotational position for use by the field-oriented controller;

wherein the rotational position estimator includes a filter that smoothes a d-axis induced voltage obtained during the estimation, and the motor rotational speed and the rotor rotational position are estimated based on the d-axis induced voltage smoothed by the filter.

8. The washing machine of claim 7, wherein the filter variably specifies a constant for determining a cutoff frequency based on a modulation factor specified by the modulation factor specifier.

9. The washing machine of claim 7, wherein the filter variably specifies a constant for determining a cutoff frequency based on a change rate of the rotational speed estimated by the rotational position estimator.

10. The washing machine of claim 7, wherein the filter is configured by an EMA (Exponential Moving Average) filter.

11. The washing machine of claim 10, wherein the EMA filter includes a non-linear term.

12. The washing machine of claim 11, wherein the non-linear term performs differential calculation on the rotational speed estimated by the rotational position estimator.

13. The washing machine of claim 7, further comprising a compressor constituting a heat pump for generating warm air for laundry dry, the washing machine controlling a motor provided in the compressor.

14. A method of motor control, comprising:

executing an over-modulation control when driving a motor by outputting sinusoidally-modulated voltage, the output voltage being specified at a modulation factor greater than 1.0;

detecting a current flowing in the motor;

executing a field-oriented control that divides the detected current into a d-axis current component and a q-axis current component and that controls each component to conform with a command current produced based on a command rotational speed by utilizing an estimated motor rotational speed and an estimated rotor rotational position; wherein the motor rotational speed and the rotor rotational position are estimated based on a d-axis induced voltage produced during the estimation, the d-axis induced voltage being smoothed by filtering.

15. The method of claim 14, wherein a constant for determining a cutoff frequency of the filter is variably specified based on the modulation factor.

16. The method of claim 14, wherein a constant for determining a cutoff frequency of the filter is variably specified based on a change rate of the estimated rotational speed.

17. The method of claim 14, wherein the filter is configured by an EMA (Exponential Moving Average) filter.

18. The method of claim 17, wherein the EMA filter includes a non-linear term.

19. The method of claim 18, wherein the non-linear term performs differential calculation of estimated rotational speed.

* * * * *

UNITED STATES PATENT AND TRADEMARK OFFICE
CERTIFICATE OF CORRECTION

PATENT NO. : 7,812,557 B2
APPLICATION NO. : 12/053795
DATED : October 12, 2010
INVENTOR(S) : Sari Maekawa It is certified that error appears in the above-identified patent and that said Letters Patent is hereby corrected as shown below:

Column 6, line 36, insert a -- . -- between "operator" and "PID"

Column 7, line 20, replace "$\theta e$" with -- $\omega e$ --

Signed and Sealed this
Fifteenth Day of March, 2011

David J. Kappos
*Director of the United States Patent and Trademark Office*